No. 733,091. PATENTED JULY 7, 1903.
C. W. TAYLOR.
GAS BURNER.
APPLICATION FILED FEB. 18, 1903.
NO MODEL.
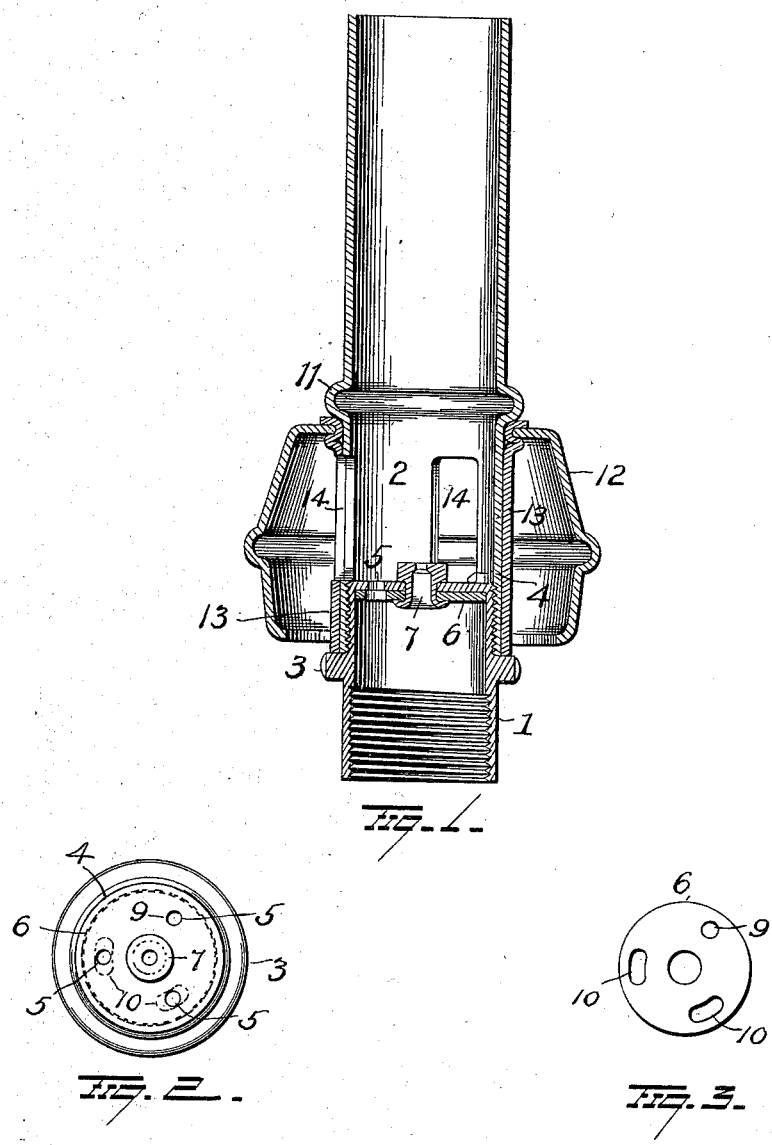

No. 733,091. Patented July 7, 1903.

UNITED STATES PATENT OFFICE.

CLARENCE W. TAYLOR, OF SIOUX CITY, IOWA.

GAS-BURNER.

SPECIFICATION forming part of Letters Patent No. 733,091, dated July 7, 1903.

Application filed February 18, 1903. Serial No. 143,929. (No model.)

*To all whom it may concern:*

Be it known that I, CLARENCE W. TAYLOR, a resident of Sioux City, in the county of Woodbury and State of Iowa, have invented certain new and useful Improvements in Gas-Burners; and I do hereby declare the following to be a full, clear, and exact description of the invention, such as will enable others skilled in the art to which it appertains to make and use the same.

My invention relates to an improvement in gas-burners, the object of the invention being to provide an improved valve mechanism for regulating the supply of gas for intermixture with air, primarily for incandescence-lighting, and a further object is to so construct and mount this valve as to preclude any possibility of leakage and lateral deflection of the gas; and with these objects in view the invention consists in certain novel features of construction and combinations and arrangements of parts, as will be more fully hereinafter described, and pointed out in the claims.

In the accompanying drawings, Figure 1 is a view in longitudinal section illustrating my improvements. Fig. 2 is a top plan view of the gas-tip, and Fig. 3 is a view of the disk valve removed.

1 represents my improved gas tube or tip, having internal screw-threads at its lower end to screw onto the ordinary gas-pipe and externally screw-threaded at its upper end to receive internal screw-threads in the lower end of a commingling or mixing tube 2, and said gas-tip 1 is made with an annular milled flange or bead 3 to facilitate its manipulation and to confine the longitudinal movement of the air-hood, as will more fully hereinafter appear. The upper end of this tip 1 is closed by an integral plate 4, having a large central opening and small openings 5 around the same, three of these smaller openings being shown, although a greater or less number may be provided, as preferred.

Beneath plate 4 a circular disk or plate 6 is securely but pivotally held by means of a hollow-headed rivet 7, and said disk is of approximately the same diameter as the internal diameter of tip 1. Rivet 7 has a head disposed against top plate 4 and passes through the central openings in plate 4 and disk 6 and is upset against the latter to clamp it against the under face of plate 4, and the head of rivet 7 is made with a central opening communicating with the bore thereof to permit the escape of gas through this rivet to the commingling or mixing tube 2.

Disk 6 is made with a small round opening 9 and two elongated slots 10, curved in the arc of a circle concentric with the center of the disk, and this opening 9 and slots 10 are adapted to aline with the openings 5 and permit the maximum supply of gas to tube 2, and the disk can be turned to close one or more of said openings 5 to regulate the supply of gas, and consequently the proper admixture of gas and air to produce the best results.

The disk 6 is turned by means of a suitable tool grasping the headed end of rivet 7, or if the joint is not too tight this turning can be accomplished by the operator grasping the rivet-head with his fingers alone.

By so constructing the valve mechanism and mounting the disk 6 inside tip 1, or, in other words, against the bottom or under face of plate 4, the pressure of gas tends to always hold the disk tight against plate 4 and insures a tight joint, whereas if the disk were on top of plate 4 the tendency would always be to raise or elevate the disk and cause an outward deflection of the gas, which is not only a financial loss, but also a source of great annoyance to users.

With my improvements the expert who places the burner in position adjusts the disk 6 to allow just the proper escape of gas, according to the pressure and character of the gas of the particular locality, and leaves only the adjustment of the air-inlet to the user, as it has been a source of great annoyance to dealers as well as a great expense to users to provide means whereby the ignorant user can adjust both the gas and air supply.

The commingling-tube 2 is made between its ends with an annular shoulder or bead 11 to limit the upward movement of the air-inlet hood 12. This hood has a bearing-tube 13, snugly fitting tube 2 and confined between bead or shoulder 11 and the annular flange 3 on tip 1, thus preventing possibility of longitudinal displacement of the hood, and air-inlet slots 14 are made in tubes 2 and 13, which may be moved into and out of alinement by turning hood 12 to regulate the size of the openings and consequent inlet of air.

A great many changes might be made in the general form and arrangement of parts described without departing from my invention, and hence I do not wish to be confined to the precise details set forth, but consider myself at liberty to make such slight changes and alterations as fairly fall within the spirit and scope of my invention.

Having fully described my invention, what I claim as new, and desire to secure by Letters Patent, is—

1. The combination with a gas-pipe tip having a perforated upper end, of a perforated valve-plate located within said pipe-tip and a tubular rivet pivotally connecting the perforated valve-plate to the perforated end of the gas-pipe tip.

2. The combination with a gas-pipe tip having a perforated upper end, of a perforated valve-plate located within the gas-pipe tip and bearing against the under face of the closed end thereof and a tubular rivet pivotally connecting the perforated plate to the perforated end of the gas-pipe tip, said rivet having a part projecting above the perforated end of the gas-pipe tip, substantially as and for the purpose set forth.

3. The combination of a gas-pipe tip having a perforated upper end, a mixing-tube secured to said tip and disposed in axial alinement therewith, a perforated valve-plate located within said tip and against the under face of the closed end thereof and a rivet pivotally connecting said perforated valve-plate to the perforated end of the tip.

4. The combination of a gas-pipe tip having a perforated upper end, a mixing-tube secured to said tip in axial alinement with the tip, a perforated valve-plate located against the under face of the closed end of the tip, and a tubular rivet pivotally connecting said valve-plate with the end of the tip, said tubular rivet constituting a constant means of communication between the tip and the mixing-tube.

5. The combination with a gas-tip closed at its upper end and externally screw-threaded at its upper end, of a commingling-tube screwed onto said tip, flanges on the tube and tip, an air-hood having a tubular bearing on said commingling-tube between said flanges, and having openings to aline with openings in the tube.

In testimony whereof I have signed this specification in the presence of two subscribing witnesses.

CLARENCE W. TAYLOR.

Witnesses:
   Geo. M. Pardoe,
   G. J. Ross.